United States Patent [19]

Goldswain et al.

[11] Patent Number: 5,496,047
[45] Date of Patent: Mar. 5, 1996

[54] MECHANICAL SEAL CONTAINING A SEALING FACE WITH GROOVED REGIONS WHICH GENERATE HYDRODYNAMIC LIFT BETWEEN THE SEALING FACES

[75] Inventors: Ian M. Goldswain, Woodlands Park; Martin W. D. B. Hignett, Chiswick, both of United Kingdom

[73] Assignee: John Crane UK Limited, Slough, United Kingdom

[21] Appl. No.: 76,542

[22] Filed: Jun. 14, 1993

[30] Foreign Application Priority Data

Jul. 4, 1992 [GB] United Kingdom ............... 9214282

[51] Int. Cl.⁶ .......................................... F16J 15/34
[52] U.S. Cl. ................... 277/96.1; 277/96; 277/65; 277/93 R; 277/81 R; 277/94; 277/38; 277/3
[58] Field of Search ................. 277/65, 93 R, 277/96.1, 81 R, 96, 94, 38, 3

[56] References Cited

U.S. PATENT DOCUMENTS

| 2,623,357 | 12/1952 | Birmann | 39.51/60 |
|---|---|---|---|
| 3,704,019 | 11/1972 | McHugh | 277/96.1 |
| 3,804,424 | 4/1974 | Gardner | 277/96.1 |
| 3,894,741 | 7/1975 | McHugh | 277/96.1 |
| 3,917,288 | 11/1975 | Huber et al. | 277/96.1 |
| 4,082,296 | 4/1978 | Stein | 277/3 |
| 4,406,466 | 9/1983 | Geary, Jr. | 961/277 |
| 4,971,306 | 11/1990 | Jinnouchi et al. | 277/3 |
| 5,071,141 | 12/1991 | Lai et al. | 96.1/277 |
| 5,092,612 | 3/1992 | Victor et al. | 277/96.1 |
| 5,174,584 | 12/1992 | Lahrman | 277/74 |

FOREIGN PATENT DOCUMENTS

| 0466076 | 1/1992 | European Pat. Off. | |
| 0581681 | 2/1994 | European Pat. Off. | 277/96.1 |
| 0469379 | 7/1991 | Germany | 277/96.1 |
| 60-222667 | 11/1985 | Japan | 277/96.1 |
| 2113173 | 4/1990 | Japan | 277/96.1 |
| 1000645 | 5/1983 | U.S.S.R. | 277/3 |
| 1719756 | 3/1992 | U.S.S.R. | 277/96.1 |
| 2197396 | 5/1988 | United Kingdom. | |
| 8809891 | 12/1988 | WIPO | 277/96.1 |

Primary Examiner—William A. Cuchlinski, Jr.
Assistant Examiner—Keith Hwang
Attorney, Agent, or Firm—Davis, BuJold & Streck

[57] ABSTRACT

A mechanical face seal has a first sealing ring mounted non-rotatably and sealed with respect to a shaft, a second sealing ring mounted non-rotatably and sealed with respect to a housing the second sealing ring being mounted in axial alignment and being resiliently urged into sealing engagement with the first sealing ring. The sealing face of the first sealing ring has a first and second set of grooved areas grooved areas of each set being spaced angularly around the circumference of the sealing face the grooved areas of one set being spaced angularly of the grooved areas of the other set, the grooved areas of both sets opening to one edge of the sealing face and extending part way across the sealing face, each grooved area defining a trailing edge relative to the direction of rotation (D) of the first sealing ring, the trailing edge of the grooves being inclined in the plane of the sealing face at an obtuse angle to the direction of rotation (D), the axial depth of the grooved areas of the first set being less than the axial depth of the grooved areas of the second set.

8 Claims, 4 Drawing Sheets

MECHANICAL SEAL CONTAINING A SEALING FACE WITH GROOVED REGIONS WHICH GENERATE HYDRODYNAMIC LIFT BETWEEN THE SEALING FACES

BACKGROUND TO THE INVENTION

The present invention relates to seals and in particular to mechanical face seals for gases, in which grooves are provided in one of the seal faces to establish a cushion of gas between the seal faces, when one seal face rotates relative to the other. While particularly suitable for use in sealing gases, seals of this type may also be used for other fluids.

With seals of this type, the pressure of gas between the seal faces and consequently the film thickness, is a function of the relative speed of rotation of the faces and the design of the grooves.

It is desirable that at slow speeds sufficient pressure will be developed between the faces to provide lift-off in order to minimise damage to the seal faces on start-up and shut-down. Furthermore, when the film thickness is small, particularly at low speeds, a film of high stiffness is required to prevent contact in the event of an instability during the running of the seal faces.

At higher speeds, the film thickness must be sufficiently large to make the seal insensitive to minor variations in counterface surface finish and to cope with swash of the seal faces and surface waviness. The running gap must also be stable to give a predictable controlled leakage and to maintain a constant flow of cooling gas across the whole face in order to ensure an even temperature distribution and avoid hot spots which would cause distortion of the seal faces.

Hitherto, these conflicting requirements have been accommodated by compromise in the design of the grooves.

SUMMARY OF THE INVENTION

According to one aspect of the present invention, a mechanical face seal for providing a seal between a pair of relatively rotatable components comprises; a first sealing ring adapted to be mounted non-rotatably and sealed with respect to one of said components, a second sealing ring adapted to be mounted non-rotatably and sealed with respect to the other component, said second sealing ring being mounted in axial alignment with the first sealing ring and means being provided to resiliently urge a sealing face of the second sealing ring axially into sealing engagement with a sealing face of the first sealing ring; the sealing face of one of the sealing rings having a first and a second set of grooved areas, the grooved areas of each set being spaced angularly around the circumference of the sealing face the grooved areas of one set being spaced angularly of the grooved areas of the other set, the grooved areas of both sets opening to one edge of the sealing face and extending part way across the sealing face, each grooved area defining a trailing edge relative to the direction of rotation of one seal face relative to the other, the trailing edge being inclined in the plane of the sealing face at an obtuse angle to the direction of rotation, the axial depth of the grooved areas of the first set being less than the axial depth of the grooved areas of the second set.

With the seal described above, the shallower grooved areas will provide high lift at low speeds for example on start-up and shut-down and will produce a stiff film of fluid; while the deeper grooved areas will produce a relatively large stable gap at high surface speeds.

The shallower grooves will also provide a film of very high stiffness at high speed if the gap is small, due for example to instabilities such as shaft movement, preventing contact between the sealing faces.

Preferably the first set of grooved areas have an axial depth of less than 10 μm and more particularly of from 2.5 μm to 7.5 μm; while the second set of grooved areas have an axial depth of greater than 10 μm and more particularly of from 25 μm to 125 μm.

A further set of grooved areas which extends the full width of the sealing face, may also be provided at angularly spaced locations, in order to further increase cooling of the faces and to permit debris to pass across the seal. These grooved areas will preferably have an axial depth of from 20 μm to 250 μm.

BRIEF DESCRIPTION OF THE DRAWINGS

The invention is now described by way of example only, with reference to the accompanying drawings, in which.

DESCRIPTION OF A PREFERRED EMBODIMENT

Figure 1:
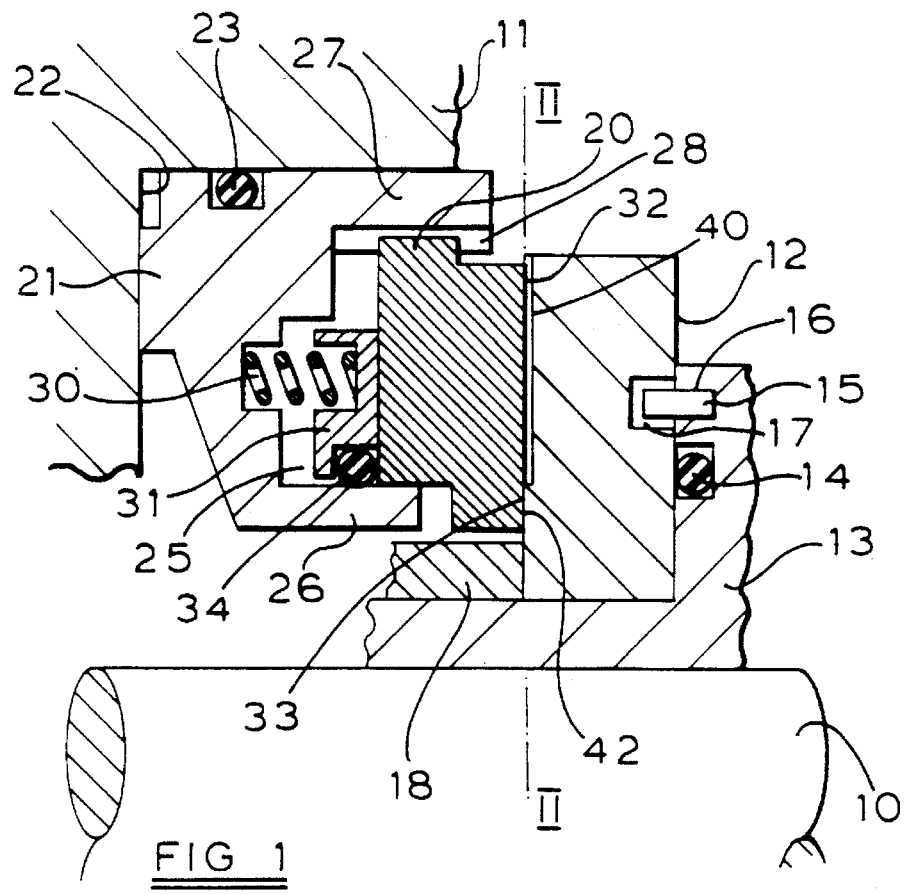
FIG. 1 illustrates in part sectional elevation a gas seal in accordance with the present invention.

As illustrated in FIG. 1, a mechanical face seal for providing a gas-tight seal between a shaft 10 and a housing 11 comprises a first sealing ring 12, which is located on a collar 13 secured to the shaft 10, in known manner. A sealing ring 12 is sealed with respect to the collar 13 by means of an elastomeric O-ring 14 or similar device and a pin 15 located in a bore 16 in the collar 13 extends into a corresponding bore 17 in sealing ring 12, to prevent relative rotation between the sealing ring 12 and shaft 10. Sleeve 18 which is secured to collar 13 in suitable manner, prevents axial movement of the sealing ring 12.

A second sealing ring 20 is located in a retaining ring 21 which is secured in a recess 22 in housing 11, in suitable manner. The retaining ring 21 is sealed with respect to the housing 11 by means of an elastomeric O-ring 23. The retaining ring 21 defines an annular recess 25, the sealing ring 20 being slidably located between walls 26 and 27 defining the recess 25, in axially opposed relationship to the sealing ring 12. A plurality of ribs 28 are provided on the face of wall 27 engaged by ring 20, the ribs 28 engaging in corresponding grooves in the outer periphery of the sealing ring 20 to prevent relative rotation between the sealing ring 20 and housing 11.

A series of angularly spaced springs 30 act between the closed end of annular recess 25 and a thrust ring 31 which acts against the back of sealing ring 20 to urge the face 32 of sealing ring 20 into sealing engagement with the opposed face 33 of sealing ring 12. The thrust ring 31 is sealed with respect to the wall 26 of annular recess 25 and the sealing ring 20, by means of an elastomeric O-ring 34.

Figure 2:
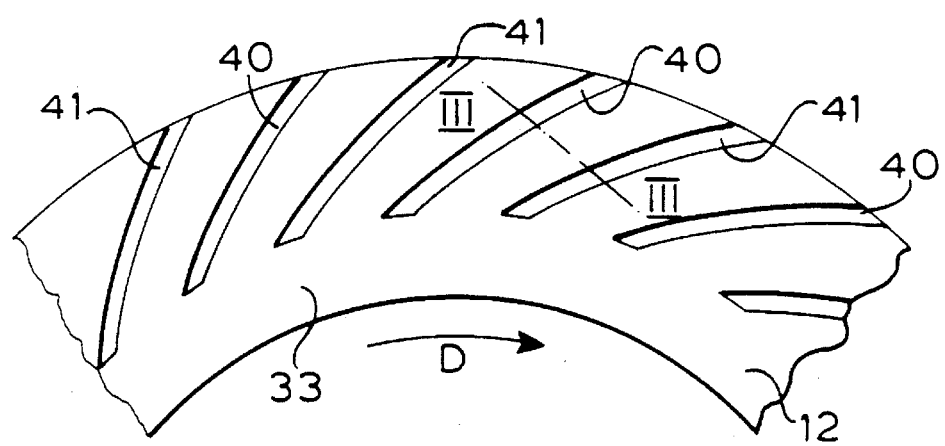
FIG. 2 is a section along the line II—II of FIG. 1.
Figure 3:
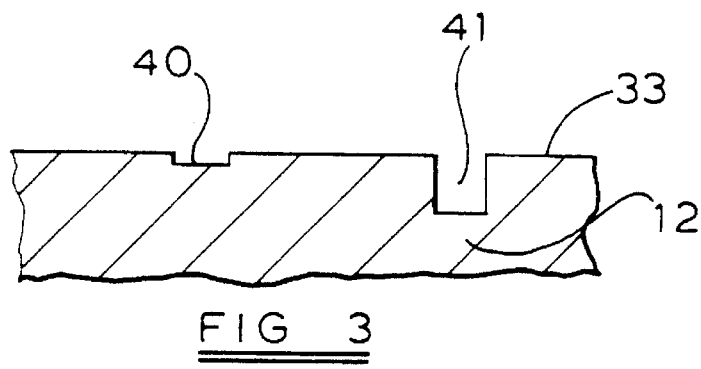
FIG. 3 is a partial section (on enlarged scale) along the line III—III of FIG. 2.

As illustrated in FIGS. 2 and 3, the face 33 of sealing ring 12 is provided with two sets of spiral grooves 40 and 41. The grooves 40 and 41 of each set are spaced angularly of each other, the grooves 40 alternating with the grooves 41. Both sets of grooves extend from the outer periphery of face 33 and are inclined rearwardly relative to the direction of rotation D of shaft 10, so that upon rotation of shaft 10 and sealing ring 12, gas will be induced to flow into the grooves 40 and 41 from the outer periphery of sealing ring 12. The grooves 40 and 41 extend only part-way across the face 33 to form a dam formation 42, which will interrupt the flow of gas and produce high pressure zones which oppose the load applied to the sealing ring 20, by means of spring 30, thereby urging the sealing faces 32 and 33 apart to provide a running clearance.

As illustrated in FIG. 3, the grooves 40 are relatively shallow having a depth of 5 μm to 6 μm while grooves 41 have a depth of 25 μm. The shallow grooves 40 will produce high pressure zones at low rotational speeds and will maintain a thin stiff film of air between the faces 32 and 33. The deeper grooves 41 will permit high flow rates at higher rotational speeds to produce a relatively thick stable film of air between the faces 40 and 41.

Figure 4:
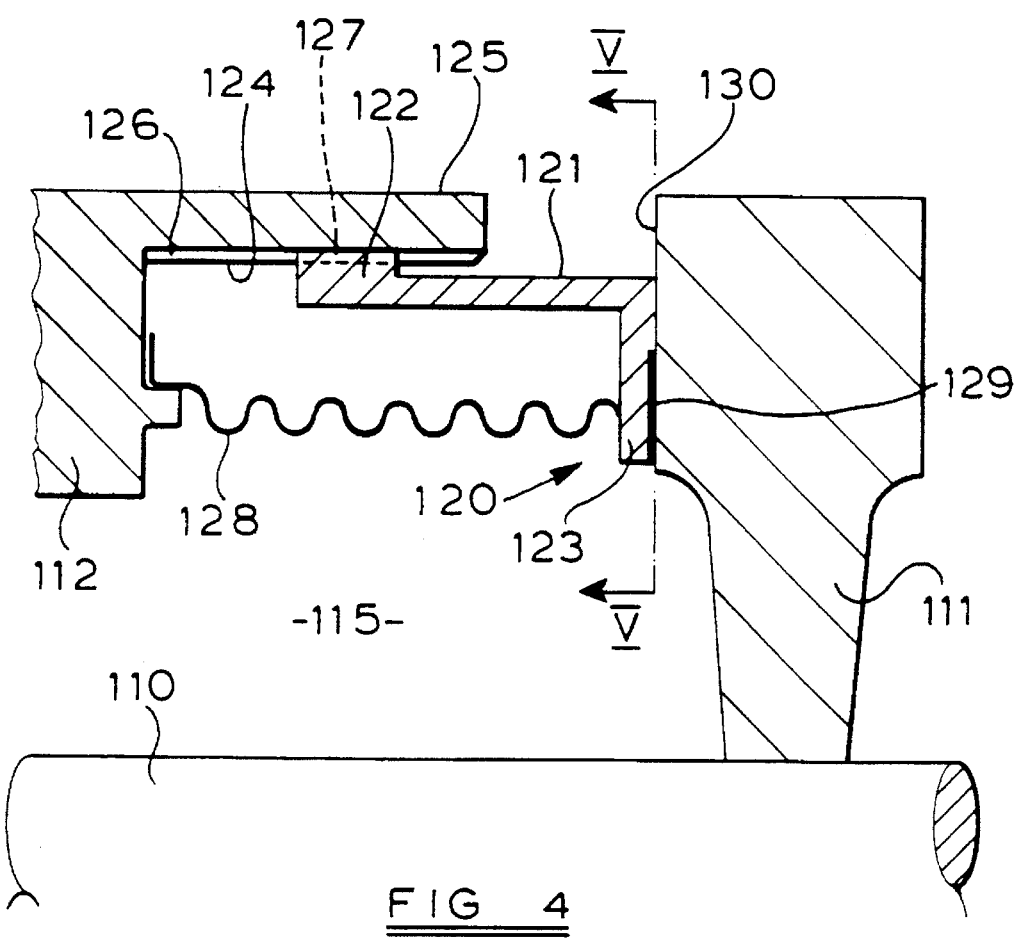
FIG. 4 is a partial cross-sectional elevation of a gas turbine with a seal in accordance with the present invention.
Figure 5:
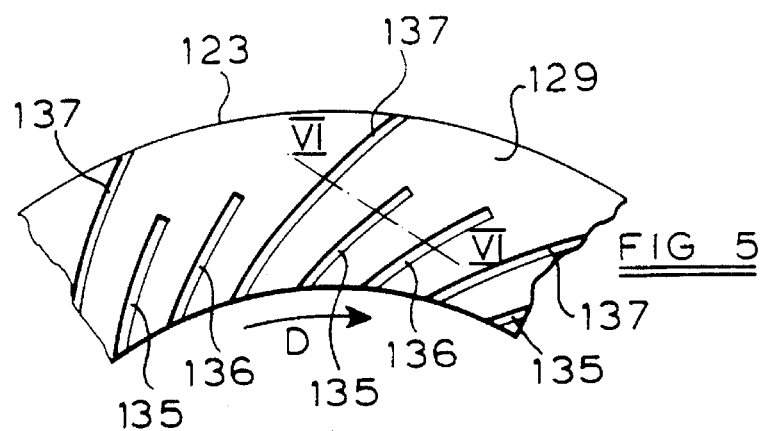
FIG. 5 is a section along the line V—V of FIG. 4.
Figure 6:
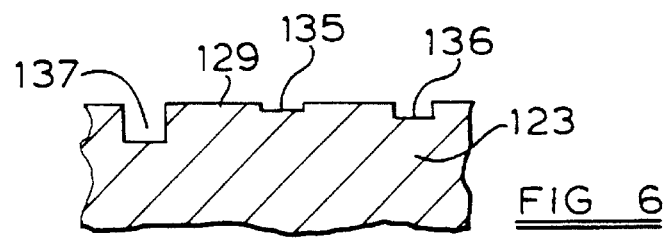
FIG. 6 is a partial section (on enlarged scale) along the line VI—VI of FIG. 5.

As illustrated in FIGS. 4 to 6 a gas turbine includes a rotor 111 mounted for rotation on shaft 110. A static ring 112 is located in juxtaposed relationship to the rotor 111. Air at high pressure is provided from a radially inwardly positioned chamber 115 and is arranged to pass through passages (not shown) in the rotor 111, for cooling purposes.

The chamber 115 is defined by an annular seal 120 which extends between the static ring 112 and rotor 111. The seal 120 comprises a sealing ring 121 having an outwardly directed flange formation 122 at one end and an inwardly directed flange formation 123 at the other end. Flange formation 122 engages the internal diameter 124 of a tubular formation 125 on static ring 112, a plurality of angularly spaced axially extending ribs 126 on the internal diameter of tubular formation 125 engaging in corresponding grooves 127 in the flange formation 122, so that sealing ring 121 will be axially slidable but rotationally fixed with respect to the static ring 112. A resilient metal bellows unit 128 is fixed at one end to the static ring 112 and at the other end to flange formation 123 of sealing ring 121, to provide a fluid-tight seal between the static ring 112 and sealing ring 121.

The resilient metal bellows unit 128 is assembled under compression, so that it biases the end face 129 of flange formation 123 into sealing engagement with an opposed face 130 formed on the rotor 111.

As illustrated in FIGS. 5 and 6, the face 129 of sealing ring 121 is provided with three sets of spiral grooves 135, 136 and 137, the grooves 135, 136 and 137 of each set being spaced angularly of each other and the grooves 136, 137, 135 of the other sets. All three sets of grooves 135, 136 and 137 extend from the inner periphery of face 129, forwardly relative to the direction of rotation of the rotor 111, so that drag resulting from movement of the rotor 111 will induce air to flow into the grooves 135, 136 and 137, from chamber 115. Grooves 135 and 136 extend only part way across the face 129, while grooves 137 extend to the outer periphery of face 129.

As illustrated in FIG. 6, the grooves 135 are relatively shallow, having a depth of 5 μm to 6 μm, while grooves 136 have a depth of 25 μm and grooves 137 have a depth of 50 μm.

Upon rotation of the rotor 111, air is drawn into the grooves 135, 136 and 137. When the air reaches the closed ends of grooves 135 and 136, high pressure zones are formed which oppose the load applied to sealing ring 121 by resilient bellows unit 128. When sufficient pressure has been built up in the zones, the faces 129 and 130 are moved apart to create a running clearance.

The shallow grooves 135 will produce high pressure zones at low rotational speeds and will maintain a thin stiff film of air between the faces 129 and 130, thus producing the requirements for start-up and shut-down conditions. The deeper grooves 136 will permit high flow rates at higher rotational speeds to produce a relatively thick stable film of air between faces 129 and 130, during normal running of the turbine.

The grooves 137 are sized to permit the passage of debris, which may otherwise clog grooves 135 and 136, from the high pressure chamber 115 across the seal 120. The grooves 137 also provide flow of air across the faces 129 and 130 in order to ensure adequate cooling.

Figure 7:
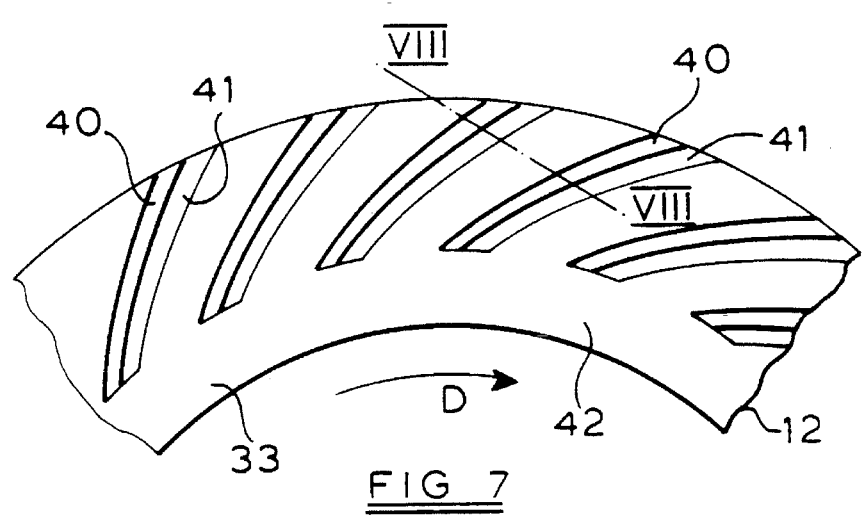
FIG. 7 is a view similar to FIG. 2 illustrating a modification to the seal illustrated in FIG. 1.
Figure 8:
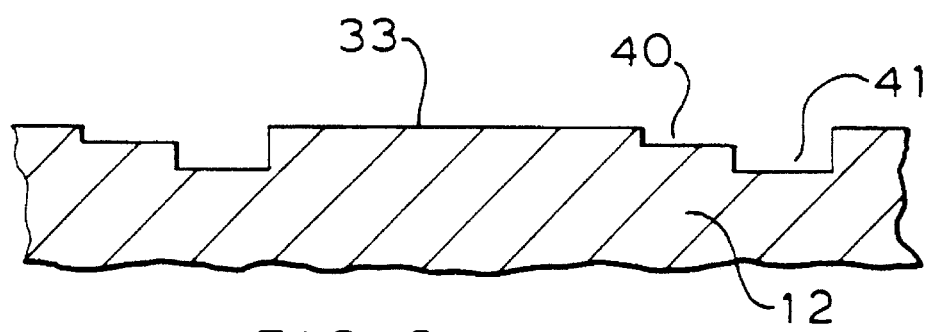
FIG. 8 is a partial section (on enlarged scale) along the line VIII—VIII of FIG. 7.

In the embodiment illustrated in FIGS. 7 and 8, the trailing edge of the deeper groove 41 relative to the direction of rotation D, coincides with the leading edge of the adjacent shallow groove 40 to form a composite groove, the deeper portion 41 of the composite groove being positioned forwardly of the shallower portion 40 relative to the direction of rotation D. This configuration of composite grooves permits an increase in the number of grooves per unit area and hence an increase in lift between the faces, where required.

Figure 9:
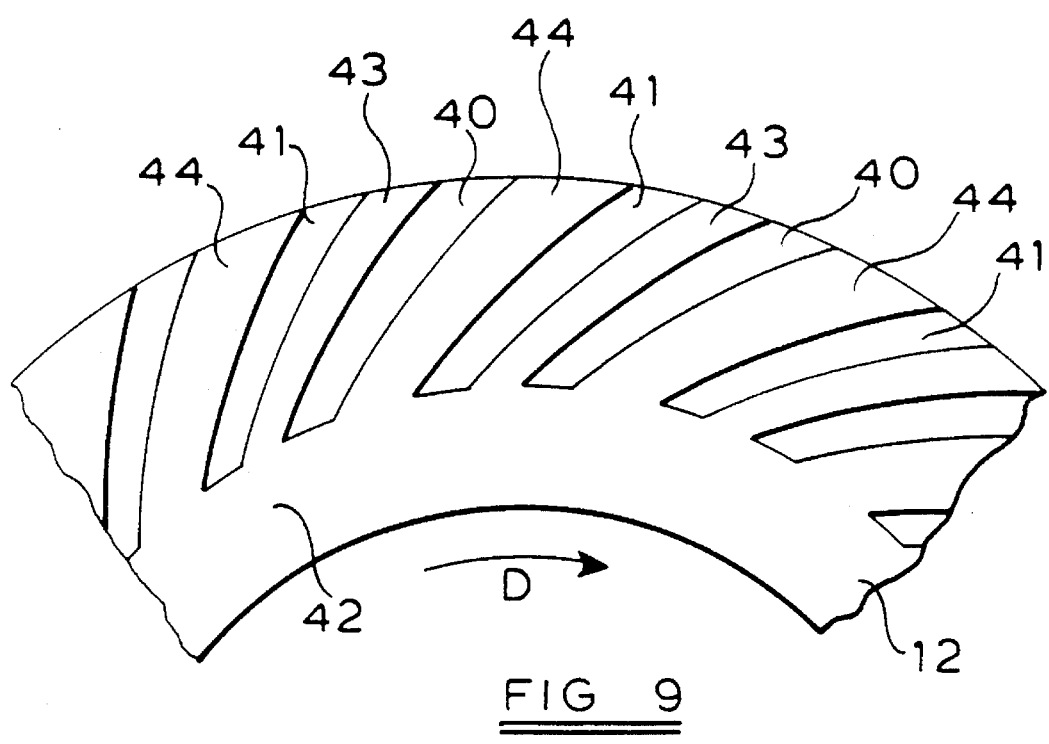
FIG. 9 is a view similar to FIG. 2 illustrating a further modification to the seal illustrated in FIG. 1.

In the embodiment illustrated in FIG. 9, the lands 43, 44 between the grooves 40 and 41 are of differing widths, the lands 43 following the shallow grooves 40 relative to the direction of rotation D being narrower than the lands 44 following the deeper grooves relative to the direction of rotation D. Typically the shallow grooves 40 and deeper grooves 41 will be of the same width the ratio of the width of the small grooves 40 to width of the lands 43 being of the order of 1:1 while the ratio of the width of the deeper grooves 41 to the width of the lands 44 is of the order of 1:1.5.

In the embodiments illustrated above, the ratio of grooves 40 to grooves 41 is 1:1; and the ratio of grooves 135 to grooves 136 to grooves 137 is 1:1:1. These ratios may however be varied to give the required performance at start-up, shut-down and under normal running of the seal. The ratio of grooved area to ungrooved area is preferably from 0.75:1 to 1.25:1.

The specific dimensions of the grooves will depend upon the particular application, for example the size of the seal and the rotational speeds of the components. Also while spiral grooves are used in the above embodiment, grooved areas of other configurations, for example as described in UK Patent Application GB 2,252,800, may alternatively be used.

While the present invention is particularly useful for use in gas turbines it may be utilised for sealing any fluid where controlled leakage of the fluid can be tolerated.

We claim:

1. A mechanical face seal for providing a seal between a pair of relatively rotatable components comprising a first sealing ring adapted to be mounted non-rotatably and sealed with respect to one of said components, a second sealing ring adapted to be mounted non-rotatably and sealed with respect to the other component, said second sealing ring being mounted in axial alignment with the first sealing ring and means being provided to resiliently urge a sealing face of the second sealing ring axially into sealing engagement with a sealing face of the first sealing ring; the sealing face of one of the sealing rings having a first and a second set of hydrodynamic lift generating grooved areas, the grooved areas of each set being spaced angularly around the circumference of the sealing face the grooved areas of one set being spaced angularly of the grooved areas of the other set, the grooved areas of both sets opening to one edge of the sealing face and extending part way across the sealing face, each grooved area defining a trailing edge relative to the direction of rotation of one seal face relative to the other, the trailing edge being inclined in the plane of the sealing face at an obtuse angle to the direction of rotation each grooved area being of constant axial depth, the axial depth of the grooved areas of the first set being less than 10 μm and the axial depth of the grooved areas of the second set being from 20 μm to 125 μm.

2. A mechanical face seal according to claim 1 in which the grooved areas of the first set have an axial depth of from 2.5 μm to 7.5 μm.

3. A mechanical face seal according to claim 1 in which the grooved areas of the second set have an axial depth of from 20 μm to 100 μm.

4. A mechanical face seal according to claim 1 in which the trailing edge of a deeper groove, relative to the direction of rotation, coincides with a leading edge of an adjacent shallow groove to form a composite groove.

5. A mechanical face seal according to claim 1 in which the lands following the deeper grooves relative to the direction of rotation are wider than the lands following the shallower grooves relative to the direction of rotation.

6. A mechanical face seal according to claim 5 in which the ratio of the width of the lands following the shallow grooves to the ratio of the width of the lands following the deeper grooves is of the order of 1:1.5.

7. A mechanical face seal according to claim 1 in which said sealing face of one of the sealing rings is provided with a third set of grooved areas, the grooved areas of the third set being spaced angularly around the circumference of the sealing face and from the grooved areas of the first and second sets, the grooved areas of the third set extending from the inner periphery to the outer periphery of the sealing face.

8. A mechanical face seal according to claim 7 in which the grooved areas of the third set have an axial depth of from 25 μm to 250 μm.

* * * * *